June 6, 1939.     S. W. NICHOLSON     2,160,895
DOOR CHECK
Filed Sept. 12, 1938
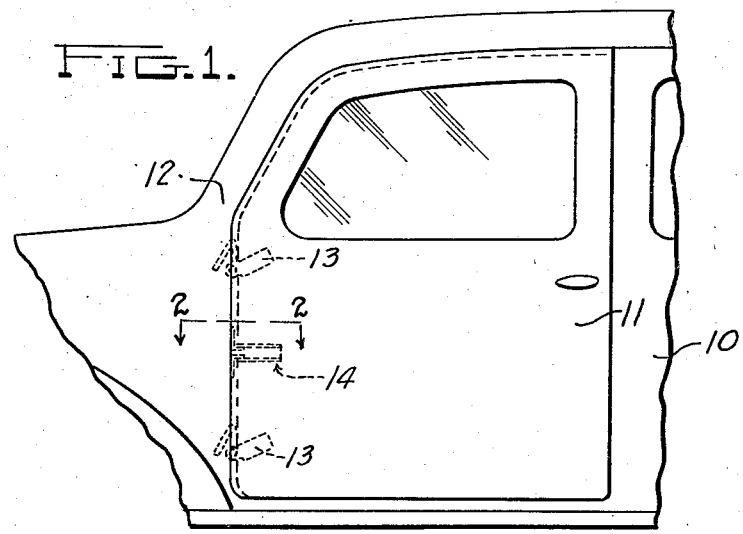
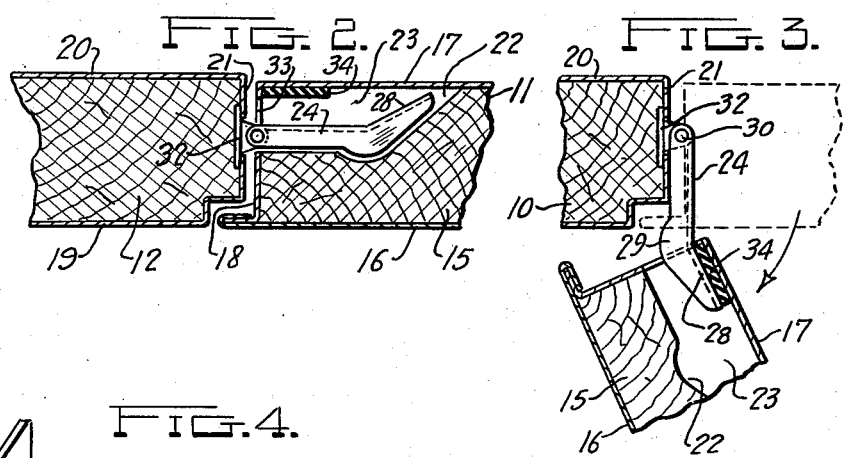
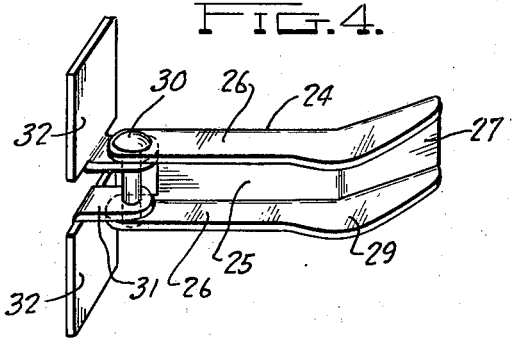
Inventor
Stanley W. Nicholson
By Malcolm W. Fraser
Attorney Patented June 6, 1939

2,160,895

UNITED STATES PATENT OFFICE 2,160,895

DOOR CHECK

Stanley W. Nicholson, Toledo, Ohio, assignor to Detroit Harvester Company, Detroit, Mich., a corporation of Michigan Application September 12, 1938, Serial No. 229,429

5 Claims. (Cl. 16—82)

This invention relates to door checks but more particularly to checks intended for automobile doors, and an object is to produce a device for limiting the opening movement of a door which is simple in construction, easy to manufacture, convenient to assemble on the door, is normally concealed and so mounted and arranged that it will not wear with continued use or cause squeaks and rattles during the operation of the vehicle.

Another object is to produce a new and improved door check for vehicle doors which limits the opening movement of the door by a shearing stress.

Other objects and advantages of the invention will hereinafter appear and an embodiment of the invention is shown on the accompanying drawing in which Figure 1 is a fragmentary side elevation of an automobile body, showing particularly the front door thereof and illustrating in dotted lines the hinges and door check therefor;

Figure 2 is an enlarged transverse sectional elevation substantially on the line 2—2 of Figure 1;

Figure 3 is a view similar to Figure 2 but showing the position of the parts when the door is in its fully opened position; and Figure 4 is a perspective view of the door check.

The illustrated embodiment of the invention comprises an automobile body 10 having a door 11 which is hingedly mounted at its front edge portion to a body post or pillar 12, concealed hinges 13 being diagrammatically illustrated providing a mounting for the door affording the swinging movement thereof. In this instance, a door check generally designated by the numeral 14 is interposed between the hinges 13 and operates to check or limit the outward swinging movement of the door 11.

As shown particularly in Figures 2 and 3, the door 11 is composed of a stile 15 which may be of wood, and an outer metal panel 16 and an inner metal panel 17 as well as an end or edge panel 18. The post or pillar 12 may be of wood and has an outer metal panel 19 and an inner metal panel 20. As shown, the ends of the panels 19 and 20 are folded over the face of the pillar to provide an edge panel 21 therefor. The stile 15 is recessed as indicated at 22 forming with the inner panel 17 a cavity 23 into which freely extends a rigid arm 24 of the door check. The arm 24 is, in this instance, formed of a metal stamping having a body portion 25 and parallel side flanges 26. The outer end portion 27 of the arm 24 inclines inwardly toward the inner door panel 17, thereby affording an abutment surface 28. The metal at 29 of the flanges 26 in the region of the bend is enlarged to reinforce the arm.

The inner end of the arm 24 is pivoted upon a rivet 30 which extends through the flanges 26 and through a pair of laterally spaced ears 31 which are integral with and extend outwardly from a pair of mounting plates 32. As shown in Figures 2 and 3, the mounting plates 32 are suitably fastened to the pillar 12 and are disposed on the inside of the panel 21, a suitable opening being formed therein to allow the ears to project outwardly therefrom. It will be observed that an enlarged opening 33 is formed in the edge panel 18 to enable the arm 24 to project freely into the opening or cavity 23. Secured to the inside of the inner door panel 17 adjacent the edge thereof is a strip 34 of rubber or other suitable material of a size to correspond approximately with the size of the abutment face 28 of the arm 24.

As shown in Figure 3, the arm 24 is so arranged that when the door is swung to its open position, the inner edges of the flanges 26 bear against the adjacent portion of the panel 21 and at the same time the abutment surface 28 abuts against the rubber bumper 34 so that a definite shearing action is imposed upon the arm 24 checking the door opening movement. Obviously when the door is closed, the arm 24 enters freely into the cavity 23, the recess 22 in the stile being shaped to the contour of the arm.

By providing a door check of this character, the necessity for rods having bumper elements thereon is obviated and the movement is checked by a single arm which, when in checking position, is in shearing relation to the associated parts. This greatly simplifies the construction and materially reduces the cost of manufacture.

It is to be understood that numerous changes in details of construction, arrangement and operation may be effected without departing from the spirit of the invention especially as defined in the appended claims.

What I claim is:

1. In a vehicle body, in combination, a door post, a door, a hinge connecting said parts, one of said parts being hollow and having an opening in its wall, and a rigid arm pivoted to the other of said parts and having its end portion extending freely into said opening, said arm being constructed and arranged to bear on one side against said other part and on the opposite side against a side of said opening so that when the door is in fully opened position further movement is checked by a shearing stress imposed on said arm.

2. In a vehicle body, in combination, a door post, a door, a hinge connecting said parts, one of said parts being hollow and having an opening in its wall, and a rigid arm pivoted to the other of said parts, the major portion of said arm being adapted to extend freely within said opening when the door is closed, an inwardly inclined end portion on said arm, and an abutment surface on the inner side of said opening engageable by said inclined end portion, said parts being so constructed and arranged that the door movement is checked by a shearing stress imposed on said arm.

3. In a vehicle body, in combination, a door post, a door, a hinge connecting said parts, said door having a cavity in its edge wall, and a rigid arm pivoted to said door post and extending into said cavity, said arm being constructed and arranged to bear when the door is fully opened against the adjacent surface of the door post on one side and on its opposite side adjacent the outer end against the inner side of said cavity so that the door is held against further opening movement solely by shearing stress imposed on said arm.

4. In a vehicle body, in combination, a door post, a door, a hinge connecting said parts, said door having a cavity in its edge wall, a rigid arm pivoted to said door post and extending into said cavity, and an inwardly inclined outer end portion on said arm, said arm being constructed and arranged to bear when the door is fully opened against the adjacent surface of the door post on one side and on its opposite side adjacent the outer end against the inner side of said cavity so that the door is held against further opening movement solely by shearing stress imposed on said arm.

5. In a vehicle body, in combination, a door post, a door, a hinge connecting said parts, said door having a cavity in its edge wall, and a rigid sheet metal arm U-shaped in cross section pivoted to said door post and extending into said cavity, said arm being constructed and arranged to bear when the door is fully opened against the adjacent surface of the door post on one side and on its opposite side adjacent the outer end against the inner side of said cavity so that the door is held against further opening movement solely by shearing stress imposed on said arm.

STANLEY W. NICHOLSON.